(No Model.) 2 Sheets—Sheet 1.
J. VAN NORMAN.
DRILLING AND TAPPING APPARATUS.
No. 314,085. Patented Mar. 17, 1885.
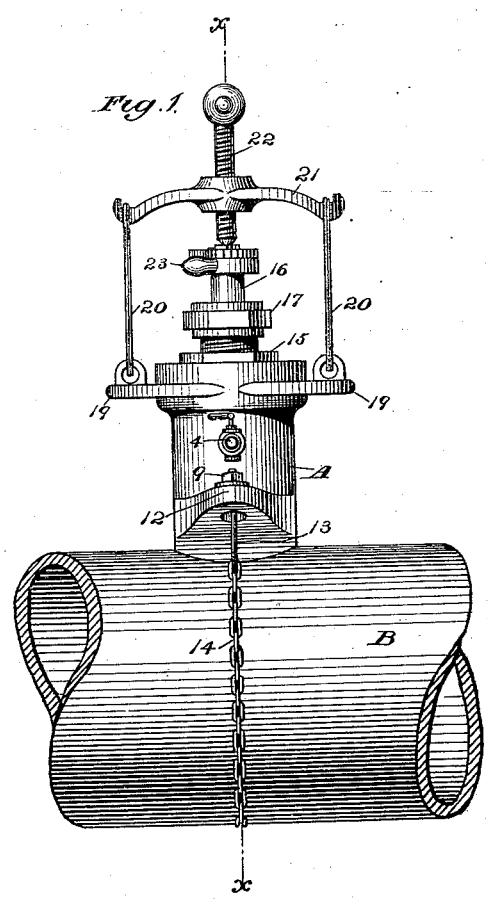
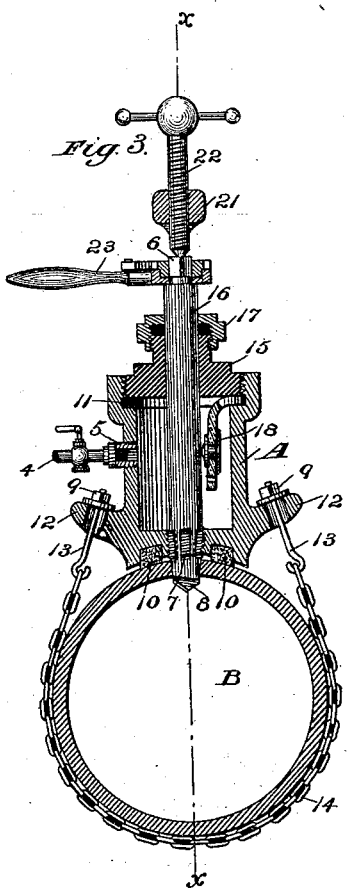
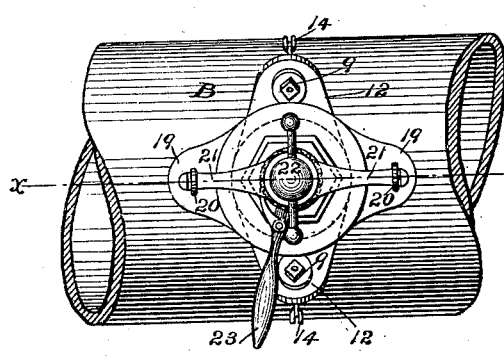
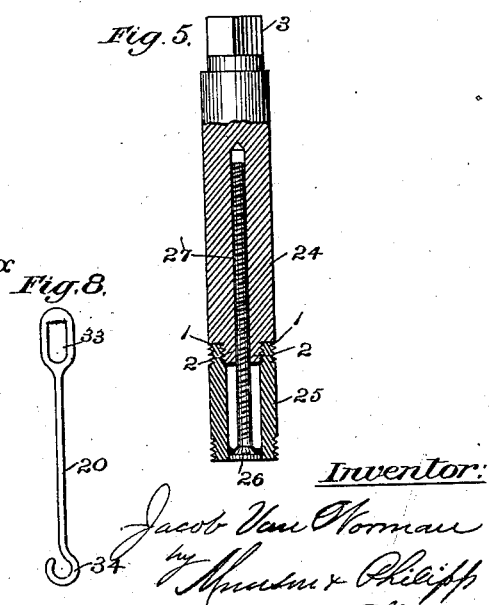
Attest:
George H. Botts.
Jas. A. Hovey.
Inventor:
Jacob Van Norman
by Munn & Philipp
attys (No Model.) 2 Sheets—Sheet 2.
J. VAN NORMAN.
DRILLING AND TAPPING APPARATUS.
No. 314,085. Patented Mar. 17, 1885.
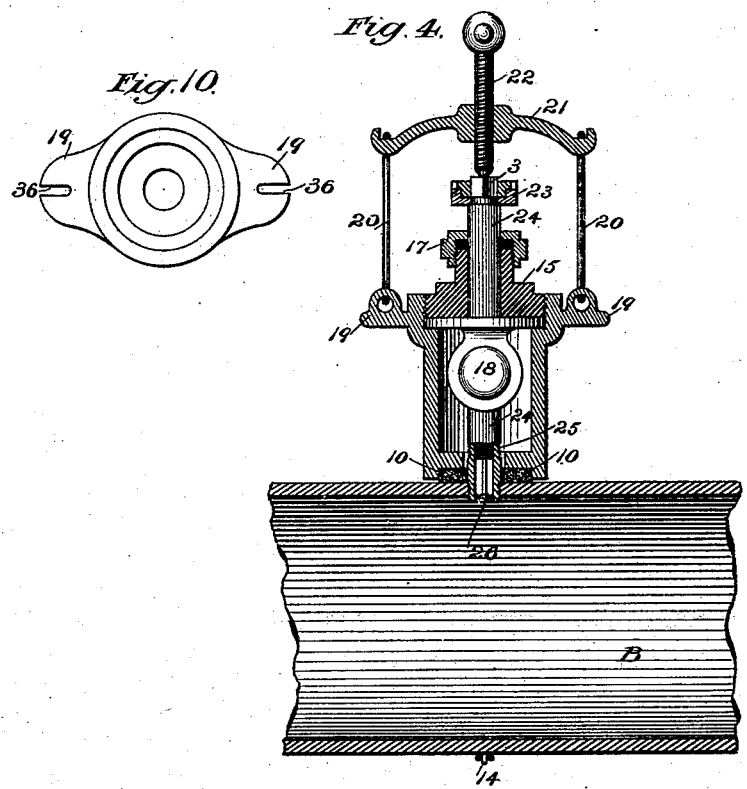
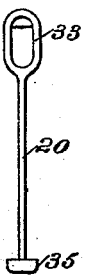
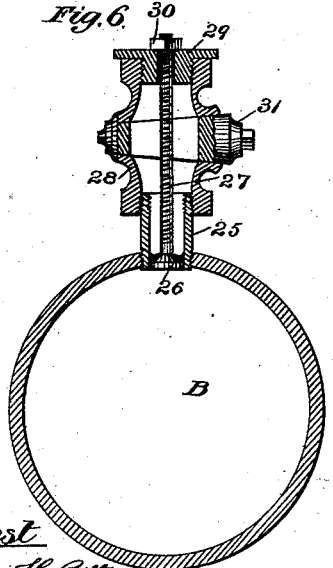
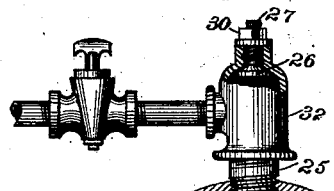
Attest
George H. Botts.
Jas. A. Hovey
Inventor:
Jacob Van Norman
by Munster & Pfeiff
attys
N. PETERS. Photo-Lithographer, Washington, D. C.

UNITED STATES PATENT OFFICE.

JACOB VAN NORMAN, OF EASTON, PENNSYLVANIA.

DRILLING AND TAPPING APPARATUS.

SPECIFICATION forming part of Letters Patent No. 313,085, dated March 17, 1885.

Application filed August 20, 1884. (No model.)

*To all whom it may concern:*

Be it known that I, JACOB VAN NORMAN, a citizen of the United States, residing in the city of Easton, county of Northampton, and State of Pennsylvania, have invented certain new and useful Improvements in Drilling and Tapping Apparatus, fully described and represented in the following specification and the accompanying drawings, forming a part of the same.

This invention relates to an apparatus which is designed and adapted for use generally in tapping and applying connections to pipes or vessels containing liquids or fluids under pressure, said apparatus being, however, especially designed for use in tapping and applying connections to gas and water pipes.

It is the object of the invention to provide an apparatus for this purpose which is simple in construction and reliable in its operation, which can be readily and quickly applied to and detached from the pipe upon which it is to operate, which is so light and compact as to be easily portable and capable of being used in situations where but little room is afforded, and by which a pipe can be quickly and easily tapped and connections applied thereto without allowing any of the contents to escape.

To these ends the invention consists in the various details of construction and combinations of parts by which these results are effected, all of which will now be fully explained, and particularly pointed out in connection with the accompanying drawings, in which—

Figure 1 is a side elevation of an apparatus embodying the invention, showing the same attached to a pipe in position for tapping the same. Fig. 2 is a plan view of the same. Fig. 3 is a sectional elevation taken upon the line *x x* of Fig. 1. Fig. 4 is a sectional elevation taken upon the line *x x* of Figs. 2 and 3, showing the means by which the connection is applied to the pipe after it has been tapped. Fig. 5 is an enlarged sectional elevation of the mandrel which is used in applying the connection. Fig. 6 is a sectional elevation showing the manner of applying a cock to the connection after the apparatus has been removed from the pipe. Fig. 7 is a similar view showing the manner of applying an elbow or T-fitting to the connection; and Figs. 8, 9, and 10 illustrate modifications in one of the details of the apparatus, to be hereinafter referred to.

Referring to said drawings, it is to be understood that the apparatus consists of a hollow casing or body, A, which may be of any suitable form in cross-section, but will preferably be cylindrical, as shown in the present case. The lower end of the casing A is provided with a central opening of sufficient size to permit the passage of the drill and tap, and is made slightly concave so as to conform approximately to the convexity of the pipe to which it is to be attached. The bottom of the casing A is also provided with an annular recess, in which is seated a thick rubber or other elastic packing, 10, which, when the casing is pressed against the pipe, serves to form a tight joint between the pipe and casing.

At a short distance from its lower end the casing is provided with a pair of outwardly-projecting ears, 12, through which pass the ends of a pair of hooks, 13, which are hooked into the ends of a chain, 14, which is passed around the pipe B when it is desired to secure the apparatus in working position. The links of the chain 14 are of sufficient size to permit the hooks 13 to be inserted through them at any point in the length of the chain, thereby permitting the chain to be adjusted to fit any size of pipe. One or both of the hooks 13 is or are screw-threaded and provided with a nut or nuts, 9, by tightening which the packing 10 can be compressed so as to form a perfectly tight joint between the pipe and casing, and by which also the casing will at the same time be clamped against the pipe, so as to be held securely in position during the operation of tapping the pipe and applying the connection.

The upper end of the casing A is closed by a head, 15, which is provided with an opening of sufficient size to receive the stem or shank 16 of the drill and tap, and with a stuffing-box, 17, which forms a perfectly tight joint around the said shank when the drill and tap is inserted through the head, as shown in Fig. 3.

The under side of the head 15 is provided with an ordinary flap-valve, 18, which is so arranged that when the drill and tap is withdrnaw after the drilling and tapping operation, it will be automatically turned up so as to close the opening in the head. As shown in the present case, the valve 18 is formed of the central portion of a leather or rubber disk, 11, the edge of which is clamped between the head 15 and the casing.

The casing A is provided near its upper end and upon opposite sides with a pair of ears or projections, 19, which are provided upon their upper sides with eyes, through which pass a pair of links, 20, the upper ends of which pass over the ends of a yoke, 21, in the center of which is formed a nut through which passes a feed screw, 22, the end of which abuts against the end of the shank 16 of the drill and tap, so as to force the same downward as the drilling and tapping progresses.

The upper end, 6, of the shank 16 is formed so as to receive an ordinary ratchet-wrench, 23, by which the drill and tap is operated in the usual manner.

The operation of the apparatus thus far described is as follows: The drill and tap having been inserted through the stuffing-box 17 so that its point 8 will be just above the packing 10, the casing A will be placed in proper position, and the chain 14 passed around the pipe and hooked onto the hooks 13. One or both of the nuts 9 will then be tightened so as to compress the packing 10 and form a tight joint between the pipe and casing, and also clamp the casing firmly onto the pipe. The drill and tap will then be pushed inward until the drill-point 8 is in contact with the pipe, after which the wrench will be placed on the upper end of the shank 16, the yoke 21 brought into position in line with the drill, and the screw 22 turned so as to press against the shank 16, as shown in Figs. 1 and 2. By then operating the wrench 23 and feed-screw 22 in the usual manner the drill 8 will be caused to cut its way through the pipe. After the drilling has been completed, the feed-screw 22 will be operated so as to force the shank 16 inward until the tap 7 is brought into position to act, after which the shank will be turned by the wrench to cut the thread in the usual manner. After the hole in the pipe has been thus drilled and threaded, the feed-screw will be backed away from the shank and the yoke 21 turned over to one side of the apparatus. The tap will then be backed out of the hole, and the tap and drill withdrawn from the casing. As soon as the point of the drill passes through the pipe, the liquid or fluid contents of the pipe will of course commence to force itself past the drill and enter the chamber in the casing A, and this will continue until the interior of the casing is filled, but the stuffing-box 17 will prevent any of said contents from escaping to the open air. In withdrawing the drill and tap, as soon as the point of the drill is drawn up into the opening in the head 15 the liquid or fluid in the interior of the casing will rush upward and fill said opening as fast as it is vacated by the drill, and this will create an upward current, which will raise the valve 18 and close the opening so as to prevent the escape of any of the contents of the pipe and chamber when the drill and tap is withdrawn.

Although, as herein shown, the drill and tap are formed upon the same rod or shank, yet it is of course to be understood that, if preferred, they may be made separate from each other. In such case, after the hole has been drilled in the pipe the drill will be withdrawn as just described, and another rod carrying the tap inserted in its stead.

In order to remove the borings from the interior of the casing A, it may be provided, as shown in Figs. 1 and 2, with a small lateral opening, 5, having a nozzle, 4, which is controlled by a suitable cock. By opening this cock an up current will be formed in the interior of the casing, which will carry out any borings which may accumulate therein.

When the apparatus is being used indoors, a hose may be attached to the nozzle 4, so as to conduct the small portion of the contents of the pipe which is thus allowed to escape to a sink or to the open air.

After the hole has been drilled and threaded as just described, the next operation is to insert therein a suitable connection. For this purpose the apparatus is provided with a hollow mandrel, 24, which is of the same diameter as the shank 16 of the drill and tap, but somewhat less in length. One end of this mandrel is provided with a square portion, 3, similar to the portion 6 of the shank 16, which is adapted to receive the wrench 23, while the other end is provided with a shoulder, 1, and a small threaded projection, 2, which is adapted to be screwed into the end of a short pipe or nipple, 25, which is provided at its opposite ends with exterior threaded portions, and is of suitable size to be screwed into the hole drilled in the pipe B.

In order to prevent the escape of the contents of the pipe B through the nipple 25 when the mandrel 24 is removed, as will be presently explained, there is inserted into the nipple, either before or after it is screwed to the mandrel, a plug, 26, which closes the opening of the nipple tightly, so as to prevent the passage of any of the contents of the pipe B. The plug 26 may be composed of rubber or other elastic material, and be held in position by friction, or it may consist of a metal disk and be secured in position by means of soft solder. In order that this plug may be readily withdrawn at the proper time, as will also be presently explained, it is provided with a stem, 27, which, when the nipple is screwed to the mandrel, slides freely into the opening in the center of the latter and extends a considerable distance beyond the end of the nipple.

After this nipple 25 has been screwed onto the mandrel and closed by the plug 26, as just explained, the end of the mandrel carrying the nipple will be passed downward through the stuffing-box 17 and into the casing A, thereby forcing the valve 18 to one side, as shown in Fig. 4. It will be observed, however, that before the valve 18 is forced away from the under face of the head 15 the stuffing-box 17 has formed a tight joint around the mandrel, so that no part of the contents of the pipe is permitted to escape during this operation. When the mandrel has been forced inward far enough to carry the end of the nipple 25 into contact with the pipe, the wrench 23 will be applied and the nipple screwed tightly into the hole in the pipe, as shown in Fig. 4. Whenever the pressure in the pipe B is so great as to make it necessary, the mandrel 24 may be forced inward by means of the feed-screw 22, as shown in Fig. 4. It will be observed that as the diameter of the nipple 25 and the drill are the same, the walls of the opening formed in the bottom of the chamber serve as a perfect guide to the nipple 25 and cause it to enter the threaded hole in the pipe with accuracy. When the nipple has been thus screwed into the pipe, the wrench 23 will be reversed, so as to disconnect the mandrel from the nipple, after which one or both of the nuts 9 will be loosened, the chain 14 unhooked, and the apparatus removed, leaving the nipple and the stem 27 projecting from the pipe, as shown in Fig. 6.

It will be observed that the projection 2 which is screwed into the upper end of the nipple, is much smaller in diameter than the threaded end of the nipple which is screwed into the pipe. From this it results that much more power will be required to unscrew the nipple from the pipe than to unscrew the mandrel from the nipple, so that when the mandrel is reversed there is no danger of unscrewing the nipple from the pipe. All that then remains to be done is to attach the desired connection to the nipple and remove the stem 27 and plug 26. If the connection to be attached is straight, an ordinary cock, 28, the plug 31 of which is provided with a circular opening of sufficient size to permit the passage of the plug 26, will be passed over the stem 27 and screwed onto the outer end of the nipple, as shown in Fig. 6. A disk or plug, 29, having a small opening of just sufficient size to receive the stem 27, will then be screwed into the outer end of the cock, and a nut, 30, will be run onto the stem and driven against the disk 29. By thus continuing to operate the nut 30 the stem 27 will be drawn outward, so as to withdraw the plug 26 from the nipple. After the plug 26 has been drawn through the opening in the plug 31 of the cock, the plug will be turned, so as to close the cock, and the disk 29, plug 26, and stem 27 will be removed. Any desired connection can then be applied to the outer end of the cock 28. The opening in the disk 29 through which the stem 27 passes is so small that very little of the contents will be allowed to leak past the stem; but if it is desired to make the joint perfectly tight a rubber or leather washer may be forced onto the stem before the disk 29 is secured in place, and such washer will as the stem is withdrawn be held against the under side of the disk, so as to prevent all leak past the stem.

If the connection to be attached to the nipple is of the elbow or T form, a special elbow or T fitting, 32, having a small opening for the passage of the stem 27, will be passed over the stem and screwed onto the nipple, as shown in Fig. 7. After the connection or connections have been attached to the fitting 32, the nut 30 will be operated so as to draw the plug 26 out of the nipple and against the inside of the fitting, so as to close the opening through which the stem passes, as also shown in Fig. 7. The outwardly-projecting end of the stem 27 may then be cut away, if desired.

It will of course be seen that modifications may be made in many of the details of the apparatus just described without departing from the principle or losing the advantages of the invention. Instead of employing the chain 14 and hooks 13 to secure the apparatus to the pipe, any other convenient or suitable form of clamping apparatus may be used. Instead of employing links to connect the yoke 21 to the casing, rods 20, such as shown in Fig. 8, may be used, the eyes 33 passing over the ends of the yoke 21, while the hooks 34 pass through the eyes upon the projections 19; or the rods 20, instead of being provided with the hooks 34, may be provided with nuts or heads 35, as shown in Fig. 9, the projections 19 being provided with slots or recesses 36, as shown in Fig. 10, into which the rods pass, so that said nuts or heads will lie upon the under sides of said projections. The valve 18 may also be greatly modified in construction without departing from the invention. Instead of a flap-valve, any of the ordinary forms of straightway-valves may be employed, the side of the casing A being provided with a suitable stuffing-box, through which the stem or rod of the valve can pass; or, if preferred, the chamber in the casing A may be of only sufficient size to receive the shank 16 or mandrel 24, and be provided with a transverse plug similar to the plug 31 of the cock 28, which can be turned when the drill and tap is withdrawn, so as to prevent the escape of the contents of the pipe.

Although, as before stated, the apparatus just described is especially designed for use in connection with water, gas, and other pipes, yet it will readily be seen that it is equally well adapted for use in tapping and applying connections to any vessel or receptacle containing a liquid or a fluid under pressure.

What I claim is—

1. The combination, with the casing A, having an opening at its upper end for the introduction of the drill, tap, or mandrel, and provided with a stuffing-box surrounding said opening, and a valve or cock for closing the same, of the interchangeable drill, tap, or mandrel 24, constructed to carry the nipple 25 at its end, substantially as described.

2. The combination, with the casing A, having an opening at its upper end for the introduction of the drill, tap, or mandrel, and provided with the stuffing-box 17, and the automatically-acting valve 18, of the interchangeable drill, tap, or mandrel 24, constructed to carry the nipple 25 at its end, substantially as described.

3. The combination, with the casing A, provided with the packing 10 and a clamping apparatus for securing it to the thing to be tapped, and having an opening at its upper end for introduction of the drill, tap, or mandrel, of the stuffing-box 17, a valve or cock for closing said opening, and the mandrel 24, constructed to carry the nipple 25 at its end, substantially as described.

4. The combination, with the casing A, having an opening for the introduction of the drill, tap, or mandrel, and a valve or cock for closing said opening, of the stuffing-box 17, packing 10, hollow mandrel 24, carrying the nipple 25, plug 26, and stem 27, substantially as described.

5. The combination, with the casing A, having an opening for the introduction of the drill, tap, or mandrel, and a valve or cock for closing said opening, of the stuffing-box 17, packing 10, hollow mandrel 24, plug 26, and stem 27, substantially as described.

6. The combination, with the hollow mandrel 24, carrying the nipple 25, of the plug 26 and stem 27, substantially as described.

7. The combination, with the hollow mandrel 24, having the threaded projection 2, of the plug 26 and stem 27, substantially as described.

8. The hollow mandrel 24, provided with the shoulder 1 and threaded projection 2, substantially as described.

9. The combination, with the hollow mandrel 24, carrying the nipple 25, of the plug 26, having the stem 27, extending beyond the end of the nipple, substantially as described.

In testimony whereof I have hereunto set my hand in the presence of two subscribing witnesses.

JACOB VAN NORMAN.

Witnesses:
A. F. WOLLNEUTH,
J. C. HAMMANN.